(12) United States Patent
Ide

(10) Patent No.: US 7,969,113 B2
(45) Date of Patent: Jun. 28, 2011

(54) MOTOR CONTROL SYSTEM

(75) Inventor: Yuji Ide, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 103 days.

(21) Appl. No.: 12/512,375

(22) Filed: Jul. 30, 2009

(65) Prior Publication Data

US 2010/0060226 A1  Mar. 11, 2010

(30) Foreign Application Priority Data

Jul. 31, 2008  (JP) ................................. 2008-197863

(51) Int. Cl.
  *G05B 13/04* (2006.01)
  *G05B 5/01* (2006.01)
  *G05D 3/12* (2006.01)

(52) U.S. Cl. ........ 318/611; 318/560; 318/623; 318/632; 700/280; 700/193

(58) Field of Classification Search ................... 318/560, 318/561, 570, 600, 611, 623, 632, 671, 675, 318/676, 687, 135; 700/44, 45, 186, 187, 700/192, 193, 280
See application file for complete search history.

(56) References Cited

U.S. PATENT DOCUMENTS

| | | | | |
|---|---|---|---|---|
| 4,843,293 A | * | 6/1989 | Futami | 318/609 |
| 5,079,493 A | * | 1/1992 | Futami et al. | 318/640 |
| 5,495,158 A | * | 2/1996 | Schmidt et al. | 318/561 |
| 5,952,804 A | * | 9/1999 | Hamamura et al. | 318/560 |
| 5,959,422 A | * | 9/1999 | Kang | 318/561 |
| 6,147,468 A | * | 11/2000 | Hamamura et al. | 318/625 |
| 6,204,622 B1 | * | 3/2001 | Tsuruta | 318/609 |
| 6,281,643 B1 | * | 8/2001 | Ebihara | 318/35 |
| 6,564,110 B1 | * | 5/2003 | Makino et al. | 700/56 |
| 6,668,202 B2 | * | 12/2003 | Makino et al. | 700/56 |
| 6,943,522 B2 | * | 9/2005 | Nagaoka et al. | 318/632 |
| 6,975,086 B1 | * | 12/2005 | Honda et al. | 318/560 |
| 7,030,585 B2 | * | 4/2006 | Iwashita et al. | 318/567 |
| 7,205,743 B2 | * | 4/2007 | Iwashita et al. | 318/568.18 |
| 7,224,141 B2 | * | 5/2007 | Ide | 318/807 |
| 7,463,938 B2 | * | 12/2008 | Hagihara et al. | 700/45 |

(Continued)

FOREIGN PATENT DOCUMENTS

JP  62-217304  9/1987

(Continued)

*Primary Examiner* — Eduardo Colon-Santana
(74) *Attorney, Agent, or Firm* — Rankin, Hill & Clark LLP

(57) ABSTRACT

A motor control system suppresses vibration of a machine base and achieves high-speed positioning without using a special sensor but using a model control system. A first feedback section outputs a first feedback command generated based on model machine base position information and containing at least position information on the machine base. A second feedback section outputs a second feedback command containing a filtered model torque command. A differential between the sum of the first feedback command and the second feedback command obtained by a second addition section and the model torque command is calculated to give the differential to an input portion of a model torque command low-pass filter and an input portion of a torque command low-pass filter. The model control system gives a model position command to a position controller as a position command, and model machine base position information generated based on the model position command is added to a speed command input from the position controller to a speed controller.

8 Claims, 13 Drawing Sheets

U.S. PATENT DOCUMENTS

| | | | |
|---|---|---|---|
| 7,733,051 B2 * | 6/2010 | Tsui et al. | 318/685 |
| 2003/0097193 A1 * | 5/2003 | Makino et al. | 700/42 |
| 2004/0095089 A1 * | 5/2004 | Collier-Hallman | 318/567 |
| 2005/0228513 A1 * | 10/2005 | Nihei et al. | 700/52 |
| 2006/0132078 A1 * | 6/2006 | Iwashita et al. | 318/568.18 |
| 2006/0138990 A1 * | 6/2006 | Ide | 318/609 |
| 2008/0116835 A1 * | 5/2008 | Tsui et al. | 318/615 |
| 2009/0251092 A1 * | 10/2009 | Zhang et al. | 318/609 |

FOREIGN PATENT DOCUMENTS

| | | |
|---|---|---|
| JP | 2002-163006 | 6/2002 |
| JP | 2004-021413 | 1/2004 |

\* cited by examiner

MOTOR CONTROL SYSTEM

BACKGROUND OF THE INVENTION

1. Field of the Invention

The present invention relates to a motor control system that includes a model control system and performs model following control.

2. Description of the Related Art

Model following control is known as a technique for high-speed positioning of a machine such as a chip mounter using a motor control system. In the model following control, a model control system simulating an actual feedback control system is built up. The feedback control system is driven to follow the model control system. FIG. 2 shows the configuration of a motor control system adopting conventional model following control disclosed in Japanese Patent Application Publication No. 62-217304 (JP62-217304A). In the control system, the deviation between a position command and a model position is acquired and supplied to a model position controller to obtain a model speed command. A deviation between the model speed command and a model speed is then acquired and supplied to a model speed controller to obtain a model torque command. The model torque command is supplied to a motor mechanical model to calculate the model speed. The model speed is supplied to an integrator to calculate the model position. A difference between the model position and a motor position detected by an encoder is acquired and supplied to a position controller to output a speed command. A deviation between a value obtained by adding the speed command and the model speed and a detected speed value is acquired and supplied to a speed controller to obtain a torque command. A value obtained by adding the torque command and the model torque command is supplied to a torque controller to drive a motor, controlling a torque of the motor. The motor mechanical model is represented as $1/\{(JM+JL)S\}$ wherein JM represents a motor inertia and JL represents a load inertia. According to the thus configured model following control, command response characteristics and disturbance suppression characteristics can be independently controlled. The disturbance suppression characteristics are restricted by high-frequency resonance of the mechanical system etc., and therefore cannot be improved more than a certain level. Meanwhile, the model response characteristics are not restricted by high-frequency resonance of the mechanical system etc., and therefore can be improved. High-speed positioning of a machine can thus be achieved by improving the command response characteristics.

For the mechanical system which is a rigid body, high-speed positioning can be achieved by performing model following control in which the motor mechanical model is a rigid body. However, actual mechanical systems have portions with a lower rigidity which cause vibration. In a machine such as a chip mounter, a motor is fixed on a machine base, and a table is driven through a ball screw, as shown in FIG. 3. The machine base is supported by leveling bolts, for example. If the motor is driven to drive the table at a high speed, the machine base sways because of the rigidity of the leveling bolts, causing vibration of the machine base.

In order to suppress such vibration of the machine base, a prefilter may be provided at an input portion of a position command. FIG. 4 is a block diagram of a motor control system that suppresses vibration of a machine base using a prefilter. As the prefilter, a notch filter may be used, for example. Vibration of the machine base can be suppressed by setting the notch frequency of the notch filter to the same value as the frequency of vibration of the machine base. FIGS. 5A and 5B show a differential position command and the positional deviation, respectively, wherein a prefilter is not used. FIGS. 6A and 6B show a differential position command and the positional deviation, respectively, wherein a prefilter is used. Comparing FIGS. 5B and 6B, it can be seen that vibration of a machine base can be suppressed by the use of a prefilter, improving the positioning settling characteristics. However, as can be seen from FIG. 6B, a positioning settling time Ts cannot be sufficiently shortened because of a delay caused by the prefilter.

Vibration of a machine base can also be suppressed using model following control disclosed in Japanese Patent Application Publication No. 2002-163006 (JP2002-163006A). FIG. 7 is FIG. 2 of JP2002-163006A. In a motor control system employing the conventional model following control, a torsion angle compensator 25 is provided in the model control system to suppress vibration. JP2002-163006A, however, does not disclose a specific mathematic model 17 for an apparatus 10 including an electric motor and a machine, although appropriate modeling is essential to suppress vibration of a mechanical system. In the technique disclosed in JP2002-163006A, feedback amounts for the torsion angle and the torsion angle speed, which are used as compensation for vibration suppression control, are adaptively controlled using values of the torsion angle and the torsion angle speed. The parameter for a pseudo speed controller 15 is also adaptively controlled in accordance with a simulated speed deviation. However, JP2002-163006A does not disclose how the parameters for a pseudo-adaptive torsion angle compensator 25 and the pseudo-adaptive speed controller 15 is determined. In order to suppress vibration of a machine base, it is necessary to cause both the gains for the pseudo-adaptive speed controller 15 and the pseudo-adaptive torsion angle compensator 25 to converge to such values that both stabilize the control system and cause no vibration. However, the pseudo-adaptive torsion angle compensator 25 and the pseudo-adaptive speed controller 15 are designed to independently operate to reduce their respective deviations. As a result, even if vibration is suppressed by feeding back the torsion angle and the torsion angle speed, for example, the vibration suppression effect may be impaired if the parameter for the pseudo-adaptive speed controller 15 is changed to restrict the simulated speed deviation. It is thus questionable whether or not vibration of a machine base is really suppressed by the technique disclosed in JP2002-163006A, since it does not clarify a machine model. In addition, because control law between the pseudo-adaptive speed controller 15 and feedbacks of the torsion angle and the torsion angle speed is not disclosed, the pseudo-adaptive torsion angle compensator 25 and the pseudo-adaptive speed controller 15 may fail to converge to suppress vibration.

In contrast, Japanese Patent Application Publication No. 2004-21413 (JP2004-21413A) discloses a conventional technique clarifying a machine model. The technique disclosed in JP2004-21413A uses a machine base model as shown in FIG. 8. In the conventional technique, position information on a machine base and model machine base position information are fed back to suppress vibration. Also, position information on a model, the model machine base position information, and a thrust command are added to position information for a feedback control system and the model machine base position information. In the technique disclosed in JP2004-21413A, a thrust command for the model is thus added to a speed command in the feedback control system through a converter. Therefore, a thrust command in the feedback control system may not match the thrust command in the model control system because of the configuration of a converter or a delay caused by a converter, even if there is no error between the model control system and the feedback control system. Consequently, sufficient model following control characteristics may not be obtained. Moreover, JP2004-21413A does not clarify how the parameters are to be set in order to suppress vibration. Therefore, it may be not be possible to both suppress vibration and achieve high-speed positioning.

The model control system of FIG. 8 is represented symbolically as shown in FIG. 9 wherein a damping term $C_b$ and a viscous resistance $C_t$ are omitted. The parameters are calculated according to the modern control theory as indicated below.

The state equations of the model control system are represented as follows:

$$\begin{bmatrix} x_T \\ \dot{x}_T \\ x_B \\ \dot{x}_B \end{bmatrix} = \begin{bmatrix} 0 & 1 & 0 & 0 \\ -\frac{K_P K_V}{J} & -\frac{K_V}{J} & -\frac{1}{J}\left(\begin{array}{c} K_P K_V + \\ K_{PB} \end{array}\right) & -\frac{1}{J}(K_V + K_{VB}) \\ 0 & 0 & 0 & 1 \\ \frac{K_P K_V}{J_B} & \frac{K_V}{J_B} & \frac{1}{J_B}\left(\begin{array}{c} K_P K_V + \\ K_{PB} - K_B \end{array}\right) & \frac{1}{J_B}(K_V + K_{VB}) \end{bmatrix}$$ [Expression 1]

$$\begin{bmatrix} x_T \\ \dot{x}_T \\ x_B \\ \dot{x}_B \end{bmatrix} + \begin{bmatrix} 0 \\ \frac{K_P K_V}{J} \\ 0 \\ -\frac{K_P K_V}{J_B} \end{bmatrix} P^* y =$$

$$[1\ 0\ 1\ 0] \begin{bmatrix} x_T \\ \dot{x}_T \\ x_B \\ \dot{x}_B \end{bmatrix}$$

According to the modern control theory, the control system is stabilized if all the poles have a negative real root. Therefore, the parameters are calculated such that the characteristic equations have a quadruple root as follows:

$$K = -4K_P$$ [Expression 2]
$$K_V = 4^4 K_P^3 J \cdot J_B / K_B$$
$$K_{VB} = -16 K_P J_B + \left(\frac{J_B}{J} - 1\right) K_V$$
$$K_{PB} = -96 J_B K_P^2 + \left(\frac{J_B}{J} - 1\right) K_P K_V + K_B$$

Thus, once a position loop gain $K_P$ is determined, a root K is determined, which then determines a speed loop gain $K_V$, a machine base speed feedback gain $K_{VB}$, and a machine base position feedback gain $K_{PB}$. For example, when $K_P$=125 rad/S in a mechanical system in which JM=8.47×10$^{-4}$ (Kg·m$^2$), JL=JM×3.66, J=JM+JL, JB=JM×70.5, and $K_B$=1595 (Nm/rad), then $K_V$=3030 Hz, $K_{VB}$=942 (Nm/(rad/s)), and $K_{PB}$=4.45×10$^4$ (Nm/rad). Thus, when the parameters are calculated so as to both suppress vibration and allow high-speed positioning with the configuration disclosed in JP2004-21413A, the gain for the model speed controller may be a value that is too large to be normally set. In vibration suppression control using model following control, vibration is suppressed by setting a parameter for the model system and a parameter for the feedback control system to the same value. It is therefore necessary to also set the gain for the speed controller in the feedback control system to a large value. However, the gain for the speed controller in the feedback control system is restricted in terms of an upper limit by the rigidity of the mechanical system etc., and thus cannot be set to a significantly large value. Thus, even if the state feedback theory is applied to the model control system of FIG. 8 to calculate such parameter values that are expected to suppress vibration and achieve high-speed positioning, vibration may still be caused, making it difficult to control the motor using the calculation results.

As another method for suppressing vibration of a machine base, it is conceivable to provide a sensor that detects vibration of the machine base. However, the sensor may reduce the reliability of the method in case of a failure, and may also increase the cost.

SUMMARY OF THE INVENTION

An object of the present invention is to provide a motor control system that suppresses vibration of a machine base and achieves high-speed positioning without using a special sensor but using a model control system, in addition to addressing the issues of the related art.

A motor control system according to the present invention comprises a feedback control system and a model control system. The feedback control system includes a position sensor, a position controller, a speed controller, a torque command low-pass filter, and a torque controller. The position sensor detects the position of a movable portion of a motor mounted on a machine base. The position controller outputs a speed command based on position information on the position detected by the position sensor and a position command. The speed controller outputs a torque command based on the speed command and speed information obtained from the position sensor. The torque command low-pass filter suppresses a high-frequency component contained in the torque command. The torque controller controls a torque of the motor based on the torque command filtered by the torque command low-pass filter.

The model control system includes a movable portion model, a machine base model, a model position controller, a model speed controller, a model torque command low-pass filter, a main feedback section, a first feedback section, a second feedback section, and a subtraction section. The movable portion model models a motion of the movable portion to output model movable portion position information on the movable portion. The machine base model models a motion of the machine base to output model machine base position information on the machine base. The model position controller models the position controller to output a model speed command. The model speed controller models the speed controller to output a model torque command. The model torque command low-pass filter models the torque command low-pass filter to filter the model torque command to obtain a filtered model torque command, and gives the filtered model torque command to the movable portion model and the machine base model. The main feedback section feeds back the model position controller and the model speed controller with model position information, which has been obtained by summing the model movable portion position information and the model machine base position information, as a model position command for a feedback system. The first feedback section outputs a first feedback command, which contains at least the model machine base position information on the machine base, based on the model machine base position information. The second feedback section outputs a second feedback command which contains information contained in the filtered model torque command. The subtraction section calculates a differential between the sum of the first feedback command and the second feedback command and the model torque command to output the differential to an input portion of the model torque command low-pass filter and an input portion of the torque command low-pass filter as a differential model torque command. The model control system is configured to give the model position command for the feedback system to the position controller as the position command, and to add a model speed command for the feedback system, which has been generated based on the model position command for the feedback system, to the speed command to be input from the position controller to the speed controller.

According to the present invention, the model control system may also be configured to add the filtered model torque command to the filtered torque command to be input to the torque controller without giving the differential model torque command to the input portion of the torque command low-pass filter.

According to the present invention, gains for the first feedback section and the second feedback section are adjustable with gains for the model position controller and the model speed controller and a parameter value for the torque command low-pass filter in the feedback control system set to arbitrary values in the physically settable range, suppressing vibration of the machine base. According to the present invention, it is thus possible to suppress vibration of a machine base and achieve high-speed positioning without using a special sensor but using a model control system.

Preferably, the first feedback section may be configured to generate the first feedback command which contains model machine base speed information and model machine base acceleration information on the machine base in addition to the model machine base position information. Compared to when only the model machine base position information is fed back, a model speed loop gain may readily be used as a generally usable value.

In implementing the present invention, the gain set for the model position controller and the gain set for the model speed controller are set to be the same as the gain set for the position controller and the gain set for the speed controller, respectively. In addition, the first feedback gain set for the first feedback section and the second feedback gain set for the second feedback section are set to suppress vibration of the machine base.

A plurality of parameters in the model control system are set such that the characteristic equations in the state equations of the model control system have a quintuple root and that the feedback control system is stabilized. If the plurality of parameters are determined in this way, vibration may be suppressed and high-speed positioning may be achieved.

According to the present invention, gains (parameters) for the first feedback section and the second feedback section are adjustable with gains for the model position controller and the model speed controller and a parameter value for the torque command low-pass filter in the feedback control system set to arbitrary values in the physically settable range, thereby suppressing vibration of the machine base and achieving high-speed positioning.

DESCRIPTION OF THE PREFERRED EMBODIMENTS

Figure 1:
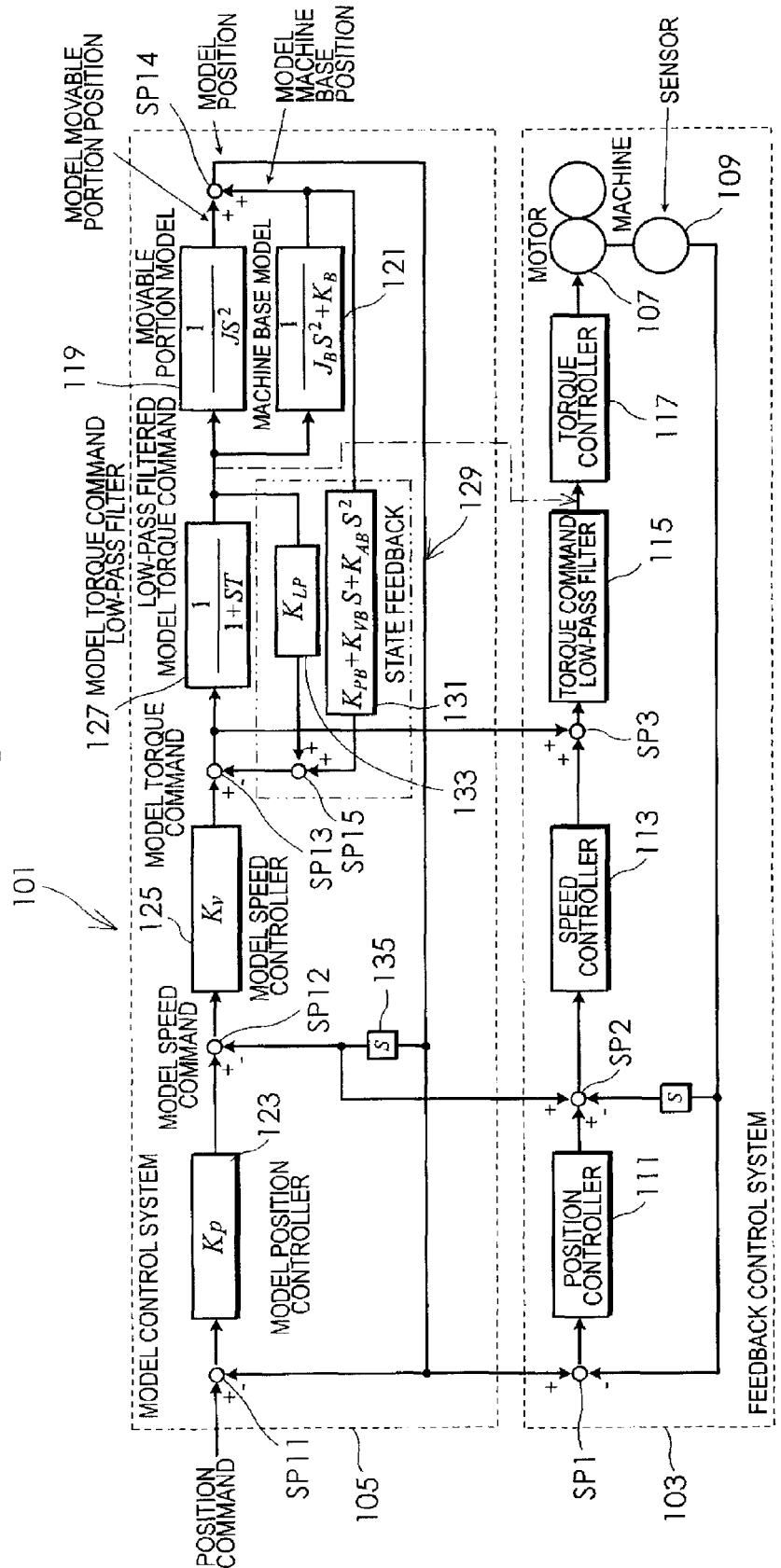
FIG. 1 is a block diagram showing the configuration of a motor control system according to the present invention.
Figure 2:
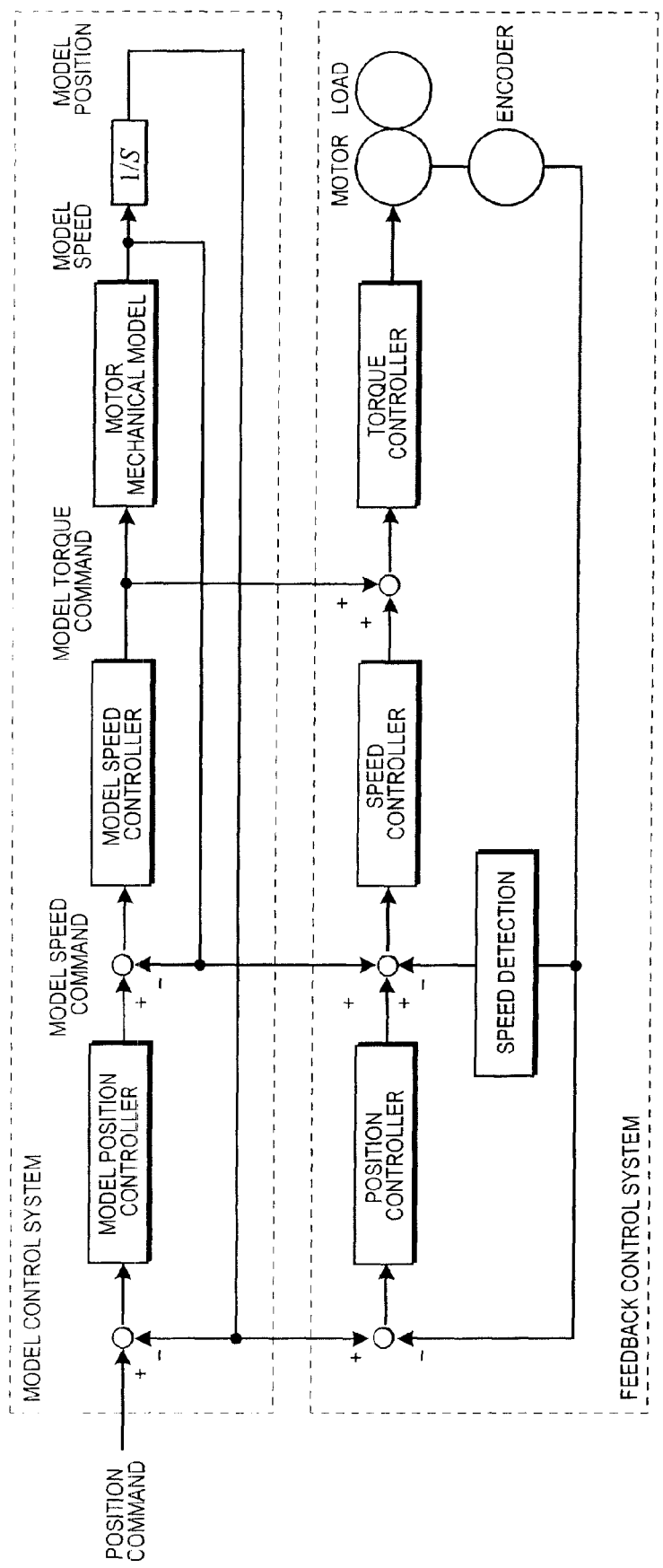
FIG. 2 shows the configuration of a motor control system adopting conventional model following control.
Figure 3:
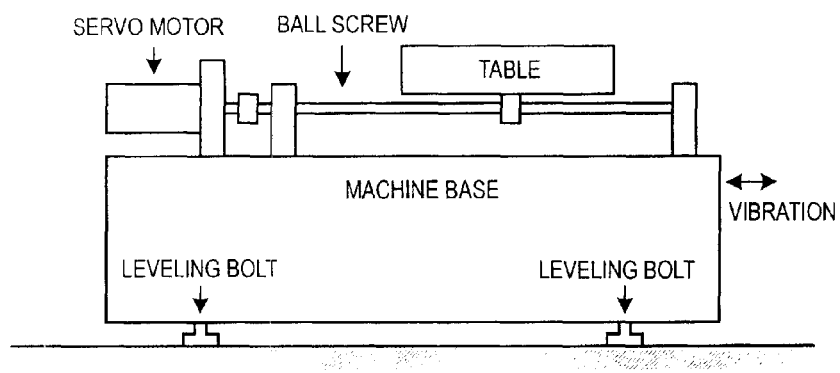
FIG. 3 shows the relationship between a motor and a machine base.
Figure 4:
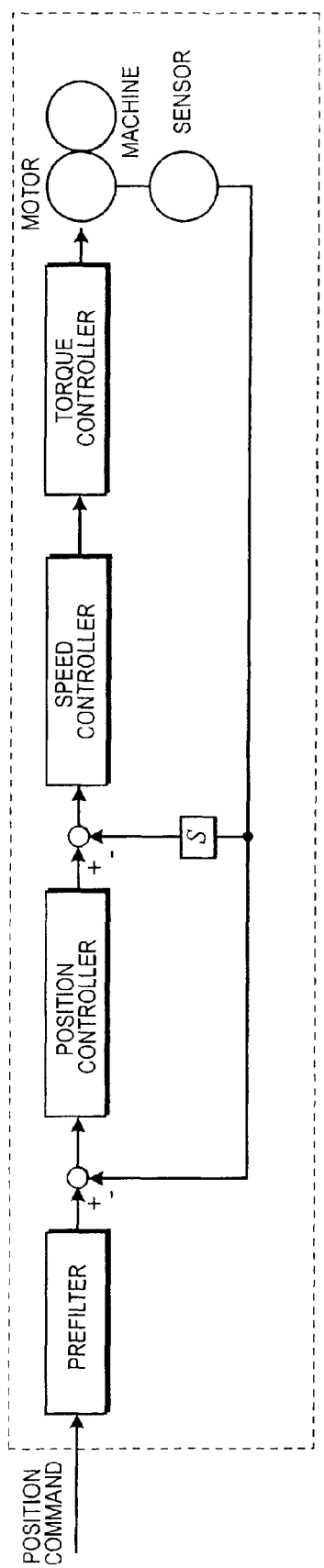
FIG. 4 is a block diagram of a motor control system that suppresses vibration of a machine base using a prefilter.
Figure 5A:
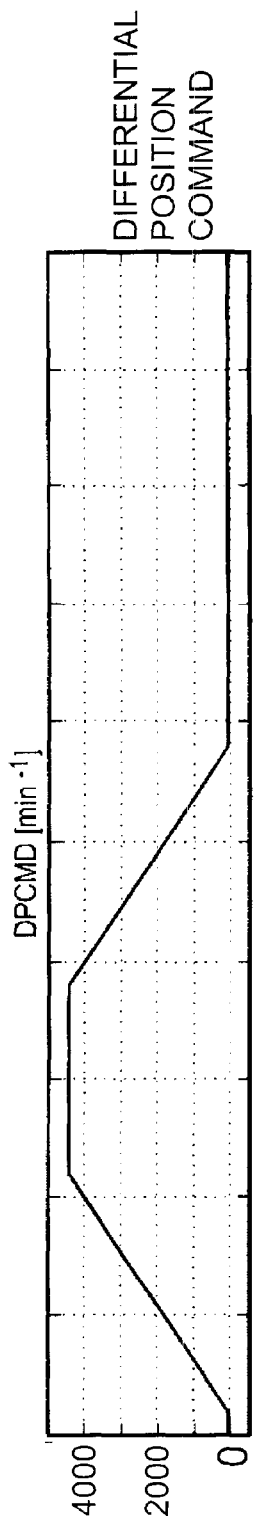
FIG. 5A shows a differential position command used.
Figure 5B:
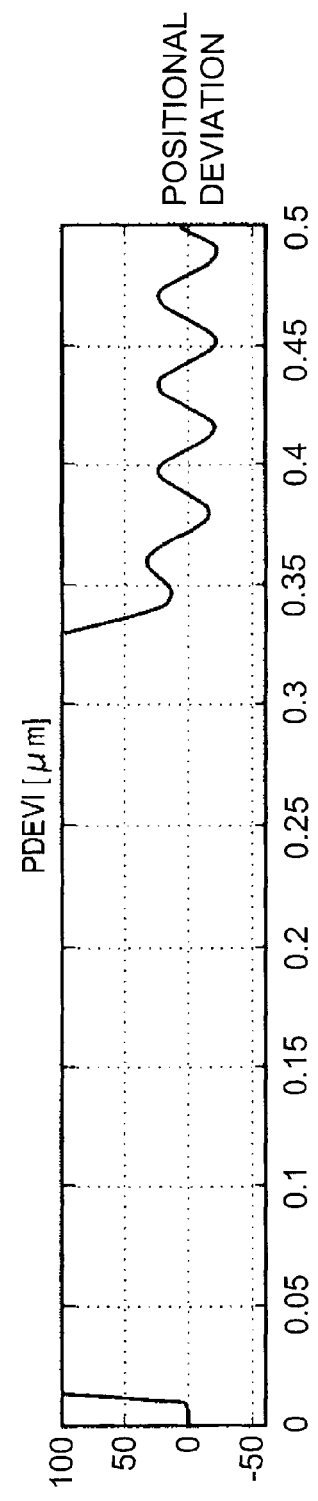
FIG. 5B shows the positional deviation with a prefilter being not used.

Hereinafter, an embodiment of the present invention will be described in detail with reference to the drawings. FIG. 1 is a block diagram showing the configuration of a motor control system according to the present invention. A motor control system 101 of the embodiment comprises a feedback control system 103 and a model control system 105. The feedback control system 103 includes a position sensor 109 that detects the rotational position of a shaft of a motor 107 and that is constituted by an encoder, a position controller 111, a speed controller 113, a torque command low-pass filter 115, and a torque controller 117. An output (position information) of the position sensor 109 is fed back to the position controller 111. Also, the output (position information) of the position sensor 109 is differentiated and fed back to the speed controller 113 as speed information. The position controller 111 receives the differential between the position information detected by the position sensor 109 and a position command calculated by a subtraction section SP1. In the embodiment, the position command for an input to the position controller 111 is a model position command for a feedback system output from the model control system 105. The position controller 111 outputs to the speed controller 133 a speed command based on the differential between the model position command for the feedback system and the position information from the position sensor 109. A subtraction section SP2 calculates the differential between the sum of the speed command and a model speed command for the feedback system output from the model control system 105 and the speed information obtained by differentiating the output of the position sensor 109. The speed controller 113 outputs a torque command based on the differential output from the subtraction section SP2. An addition section SP3 adds the torque command output from the speed controller 113 and a differential model torque command given from the model control system 105. The differential model torque command will be discussed later. The added torque command is input to the torque command low-pass filter 115. The torque command low-pass filter 115 suppresses high-frequency components contained in the added torque command output from the addition section SP3. The torque controller 117 controls a torque of the motor 107 based on the torque command filtered by the torque command low-pass filter 115.

The model control system 105 includes a movable portion model 119, a machine base model 121, a model position controller 123, a model speed controller 125, a model torque command low-pass filter 127, a main feedback section 129, a first feedback section 131, a second feedback section 133, first to third subtraction sections SP11 to SP13, and first and second addition sections SP14 and SP15. The movable portion model 119 models a motion of a movable portion of the motor 107 to output model movable portion position information. The machine base model 121 models a motion of a machine base to output model machine base position information. The model position controller 123 models the position controller 111 to output the model speed command. The model speed controller 125 models the speed controller 113 to output a model torque command. The model speed controller 125 is constituted by a proportional controller because no disturbance is applied to a model. The model torque command low-pass filter 127 models the torque command low-pass filter 115 using a primary low-pass filter to low-pass filter the model torque command to obtain a filtered model torque command, and gives the filtered model torque command to the movable portion model 119 and the machine base model 121. The main feedback section 129 feeds back the model position controller 123 and the model speed controller 125 with model position information, which has been obtained by summing the model movable portion position information and the model machine base position information by means of the first addition section SP14, as the model position command for the feedback system. The first subtraction section SP11 subtracts the model position command for the feedback system from the input position command, and inputs the subtraction results to the model position controller 123. The model position command for the feedback system is differentiated by a differentiator 135 to be converted into the model speed command for the feedback system. The second subtraction section SP12 subtracts the model speed command for the feedback system from the model speed command output from the model position controller 123 to output the subtraction results to the model speed controller 125. The first feedback section 131 outputs a first feedback command generated based on the model machine base position information and containing not only the model machine base position information but also model machine base speed information and model machine base acceleration information. The second feedback section 133 outputs a second feedback command obtained by multiplying the filtered model torque command by a predetermined gain $K_{LP}$. The third subtraction section SP13 calculates the differential between the sum of the first feedback command and the second feedback command obtained by the second addition section SP15 and the model torque command to output the differential to an input portion of the model torque command low-pass filter 127 and an input portion of the torque command low-pass filter 115 in the feedback control system 103 (the addition section SP3).

The model control system 105 gives the model position command for the feedback system, which is obtained from the first addition section SP14 as the model position information, to the position controller 111 as the position command. The model control system 105 also adds the model speed command for the feedback system, which is obtained by differentiating the model position command for the feedback system by means of the differentiator 135, to the speed command input from the position controller 111 to the speed controller 113.

In the embodiment, state feedback is performed on a motor mechanical model (119, 121) including the machine base using the first feedback section 131 and the second feedback section 133. Parameters for the controllers are determined so as to stabilize the model control system 105 and cause no vibration of the machine base.

The first feedback section 131 adds a machine base position feedback gain $K_{PB}$, a machine base speed feedback gain $K_{VB}$, and a machine base acceleration feedback gain $K_{AB}S^2$ to obtain a sum gain $(K_{PB}+K_{VB} K_{AB}S^2)$ to output the first feedback command obtained by multiplying the model machine base position information by the sum gain. The sum of the first feedback command and the second feedback command is used as a state feedback amount.

According to the embodiment, as described above, the output of the model torque command low-pass filter 127, the model machine base position information, the model machine base speed information, and the model machine base acceleration information are used for state feedback. This allows a model position gain $K_P$ and a parameter (time constant) for the model torque command low-pass filter 127 to be freely set while suppressing vibration of the machine base. In the embodiment, the subtraction section SP1 calculates the deviation between the model position command for the feedback system output from the model control system 105 and the position information (position feedback command) detected by the position sensor 109 constituted from an encoder, and supplies the deviation to the position controller 111 which outputs the speed command. The subtraction section SP2 calculates the deviation between the result of adding the speed command and the model speed command for the feedback system output from the differentiator 135 and information (speed feedback command) obtained by differentiating the position information detected by the position sensor 109 constituted from an encoder. The deviation is supplied to the speed controller 113 which outputs a torque command. The subtraction section SP13 subtracts the state feedback amount obtained as the sum of the first feedback command and the second feedback command from the model torque command to obtain the differential model torque command. The addition section SP3 adds the differential model torque command to the torque command. A command obtained as a result of the addition is supplied to the torque command low-pass filter 115 to be filtered, and then input to the torque controller 117. An output of the torque controller 117 is used to drive the motor 107.

Figure 10:
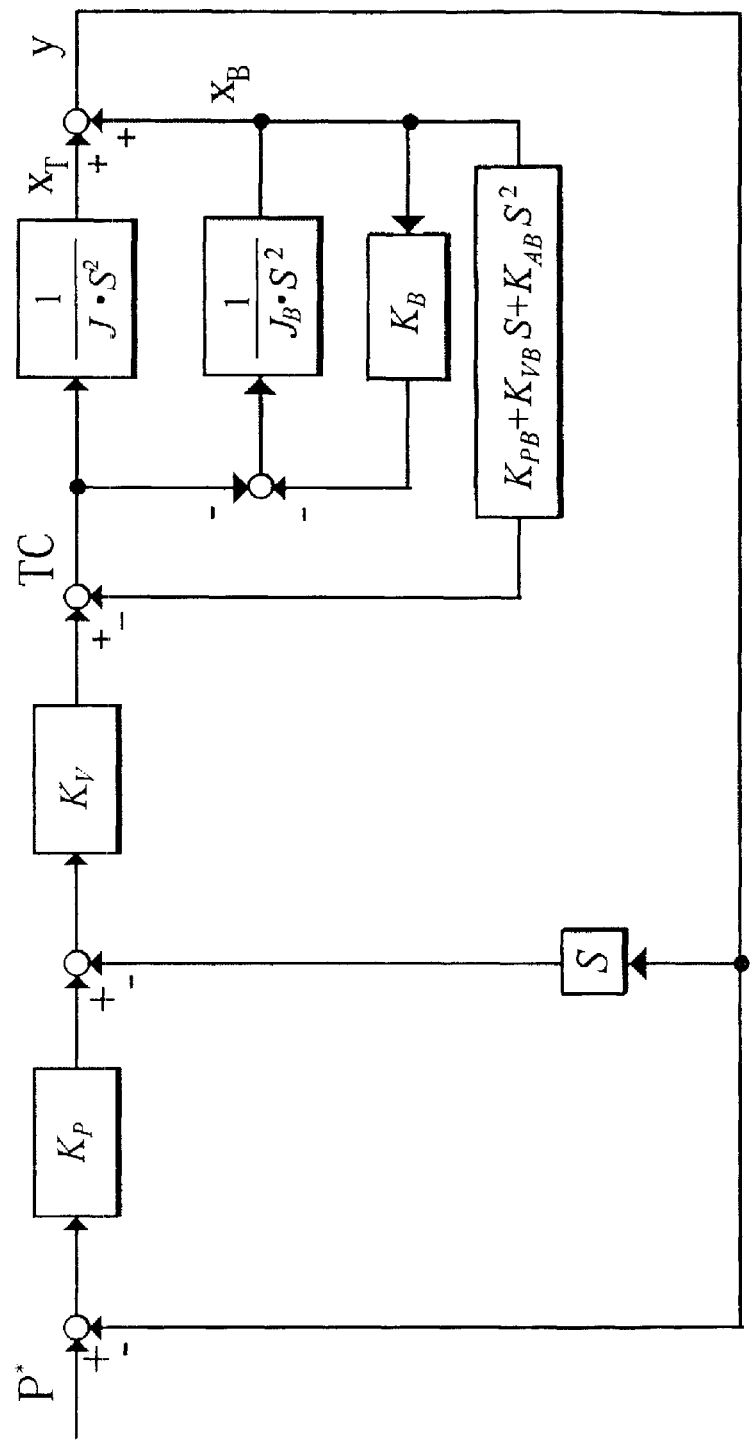
FIG. 10 is a block diagram showing the configuration in which only model machine base position information, model machine base speed information, and model machine base acceleration information are fed back without using a torque command low-pass filter or a second feedback section.

State equations for the thus configured model control system are described below. FIG. 10 is a block diagram showing the configuration in which only the model machine base position information, the model machine base speed information, and the model machine base acceleration information are fed back without using the model torque command low-pass filter 127 or the second feedback section 133. In FIG. 10, each element is represented using a corresponding symbol used in the expressions. Here, the parameters are calculated according to the modern control theory such that the characteristic equations have a quadruple root as follows:

$$K = -4K_P \quad \text{[Expression 3]}$$

$$K_V = 4K_P \cdot J$$

$$K_{AB} = -\frac{K_B}{4^3 K_P^2} + J_B$$

$$K_{VB} = -4K(-J_B + K_{AB}) - \left(1 - \frac{J_B}{J}\right)K_V$$

$$K_{PB} = 6K^2(-J_B + K_{AB}) - \left(1 - \frac{J_B}{J}\right)K_P K_V + K_B$$

It can be seen from the above results that when the position loop gain $K_P$ is determined, the root K is determined, which then determines the speed loop gain $K_V$, the machine base acceleration feedback gain $K_{AB}$, the machine base speed feedback gain $K_{VB}$, and the machine base position feedback gain $K_{PB}$. For example, when $K_P$=125 rad/S in a mechanical system in which JM=8.47×10$^{-4}$ (Kg·m$^2$), JL=JM×3.66, J=JM+JL, JB=JM×70.5, and $K_B$=1595 (Nm/rad), then $K_V$=80 Hz, $K_{AB}$=0.058 (Nm/(rad/S)$^2$), $K_{VB}$=24.9 (Nm/(rad/s)), and $K_{PB}$=2.72×10$^3$ (Nm/rad). When state feedback is performed as in the configuration of FIG. 10 to calculate the parameters so as to both suppress vibration of the machine base and achieve high-speed positioning, the speed loop gain $K_V$ for the model speed controller 125 takes a value that can be normally set. If there is no high-frequency resonance of the mechanical system or high-frequency components based on the encoder in the feedback control system, vibration of the machine base is suppressed and high-speed positioning is achieved using the control system according to the configuration of FIG. 10.

Figure 11:
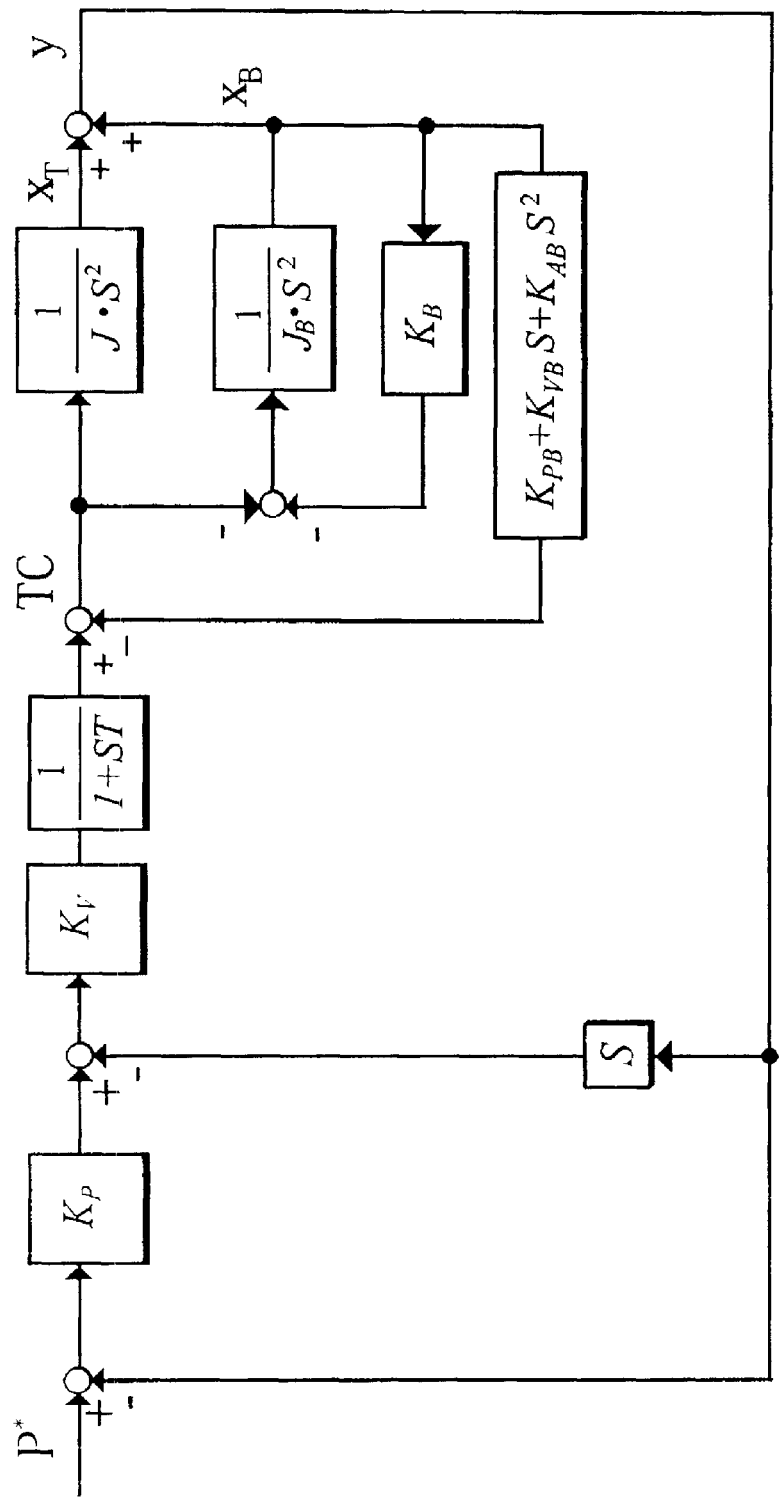
FIG. 11 is a block diagram showing the configuration in which only model machine base position information, model machine base speed information, and model machine base acceleration information are fed back using a torque command low-pass filter but without using a second feedback section.

If there is no high-frequency resonance of the mechanical system or high-frequency components based on the encoder in the feedback control system, however, a model torque command low-pass filter should be added as shown in FIG. 11. If a model torque command low-pass filter is provided as shown in FIG. 11, the parameters are calculated according to the modern control theory such that the characteristic equations have a quintuple root as follows:

$$K = -5K_P \quad \text{[Expression 4]}$$

$$K_V = 4J \cdot K_P$$

$$T = \frac{4K_B}{5^5 K_P^3 J_B}$$

$$T2 = -\frac{1}{5K}$$

$$K_{AB} = J_B - 5^2 K_P J_B T$$

$$J2 = \frac{J_B - K_{AB}}{J_B}J, \quad J_B2 = J_B - K_{AB},$$

$$K_B 2 = \frac{J_B - K_{AB}}{J_B}K_B$$

$$K_{VB} = -\frac{10K^2 T2 \cdot J2 \cdot J_B 2 - K_B 2 \cdot T2 \cdot J2 + K_V J_B 2 + K_V J2}{J2}$$

$$K_{PB}2 = -\frac{10K^3 T2 \cdot J2 \cdot J_B 2 + K_P K_V J2 - K_B 2 \cdot J2 - K_P K_V J_B 2}{J2}$$

$$K_{PB} = K_{PB}2 + \frac{K_{AB}K_B}{J_B}$$

From the above results, it can be seen that once the position loop gain $K_P$ is determined, the root K is determined, which then determines the speed loop gain $K_V$, the machine base acceleration feedback gain $K_{AB}$, the machine base speed feedback gain $K_{VB}$, the machine base position feedback gain $K_{PB}$, and the time constant T of the model torque command low-pass filter. Therefore, there is no degree of freedom in setting the time constant T of the model torque command low-pass filter. In general, the time constant T of the model torque command low-pass filter is adjusted in accordance with high-frequency resonance of a mechanical system, and thus it is necessary that the time constant T be freely adjustable. Simply according to the configuration shown in FIG. 11, however, the time constant T of the model torque command low-pass filter is not adjustable.

According to the embodiment of the present invention shown in FIG. 1, in contrast, the output of the model torque command low-pass filter 127 is fed back, making it possible to adjust various parameters including the time constant T of the model torque command low-pass filter 127. The state equations for the configuration shown in FIG. 1 are as follows:

$$dX/dt = AX + BU$$

$$y = CX$$

where y represents a model position command, and A, B, and C are defined as follows:

$$A = \begin{bmatrix} 0 & 1 & 0 & 0 & 0 \\ 0 & 0 & 0 & 0 & \frac{1}{J_3} \\ 0 & 0 & 0 & 1 & 0 \\ 0 & 0 & \frac{-K_{B3}}{JB_3} & 0 & \frac{-1}{JB_3} \\ \frac{-K_P \times K_V}{T_3} & \frac{-K_V}{T_3} & \frac{\left(\frac{-K_P \times K_V -}{K_{PB3}}\right)}{T_3} & \frac{\left(\frac{-K_V -}{K_{VB}}\right)}{T_3} & \frac{-1}{T_3} \end{bmatrix} \quad \text{[Expression 5]}$$

$$B = \begin{bmatrix} 0 \\ 0 \\ 0 \\ 0 \\ \frac{K_P \times K_V}{T_3} \end{bmatrix}$$

$$C = [1\ 0\ 1\ 0\ 0]$$

$$T_2 = \frac{T}{1 + K_{LP}},$$

$$J_2 = J(1 + K_{LP}), \quad J_{B2} = J_B(1 + K_{LP}),$$

$$K_{B2} = K_B(1 + K_{LP})$$

$$T_3 = \frac{J_{B2}}{J_{B2} - K_{AB}}T_2,$$

$$J_3 = \frac{J_{B2} - K_{AB}}{J_{B2}}J_2, \quad J_{B3} = J_{B2} - K_{AB},$$

$$K_{B3} = \frac{J_{B2} - K_{AB}}{J_{B2}}K_{B2}$$

-continued $$K_{PB3} = K_{PB} - \frac{K_{AB}K_{B2}}{J_{B2}}$$

The parameters are calculated such that the characteristic equations in the state above equations have a quadruple root as follows. $K_V$ is defined as $4J_2 \cdot K_P$ to stabilize control systems for speed and position.

$$K = -5K_P \quad \text{[Expression 6]}$$

$$T_2 = \frac{4K_B}{5^5 K_P^3 J_B}$$

$$K_{LP} = \frac{T}{T_2} - 1$$

$$K_{AB} = J_{B2} - 5^2 K_P J_{B2} \cdot T_2$$

$$K_{VB} = -\frac{10K^2 T_3 \cdot J_3 \cdot J_{B3} - K_{B3} \cdot J_3 \cdot}{J_3}$$

$$K_{PB3} = -\frac{-10K^3 T_3 \cdot J_3 \cdot J_{B3} + K_P K_V J_3 -}{J_3}$$

$$K_{PB} = K_{PB3} + \frac{K_{AB}K_{B2}}{J_{B2}}$$

When the parameters for respective portions of the model are set as indicated above, positioning is performed in such a manner that causes no vibration of the machine base.

The parameters are set as follows. The time constant of the torque command low-pass filter 115 in the feedback control system 103 is set to such a large value that suppresses quantized ripples of the position sensor 109 constituted from an encoder and high-frequency resonance of the mechanical system. The loop gain of the speed controller 113 is adjusted to a value that is as large as possible in the range where no high-frequency resonance of the mechanical system is excited. The position loop gain for the position controller 111 is set to be around one-fourth the speed loop gain so as to stabilize the control systems for position and speed. The loop gain $K_P$ for the model position controller 123, the loop gain $K_V$ for the model speed controller 125, and the time constant T for the model torque command low-pass filter 127 in the model control system 105 are set to the same value as the time constant of the torque command low-pass filter 115 in the feedback control system 103. Parameters for the movable portion model 119 and the machine base model 121 in the model control system 105 are set according to the actual values of the mechanical system. The state feedback gain $(K_{PB}+K_{VB}+K_{AB}S^2)$ and $K_{LP}$ are calculated based on these parameters.

Figure 6A:
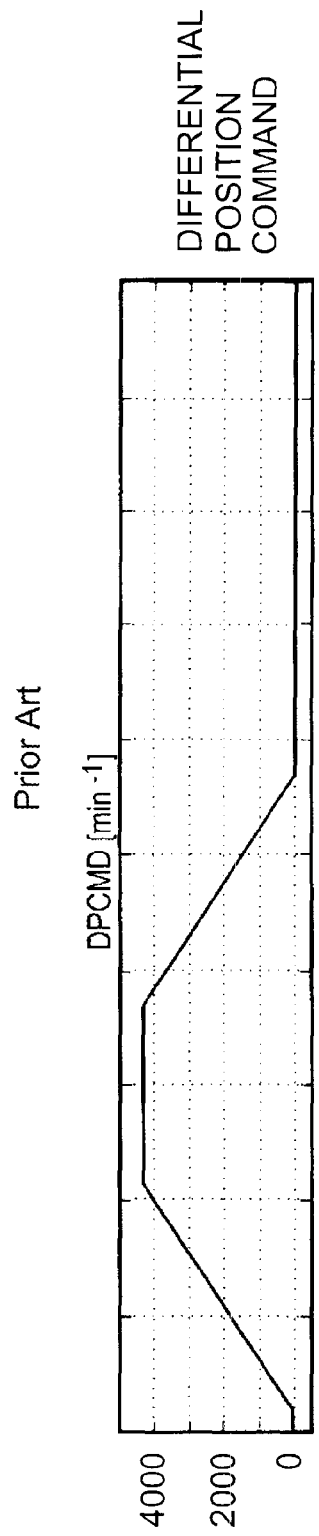
FIG. 6A shows a differential position command used.
Figure 6B:
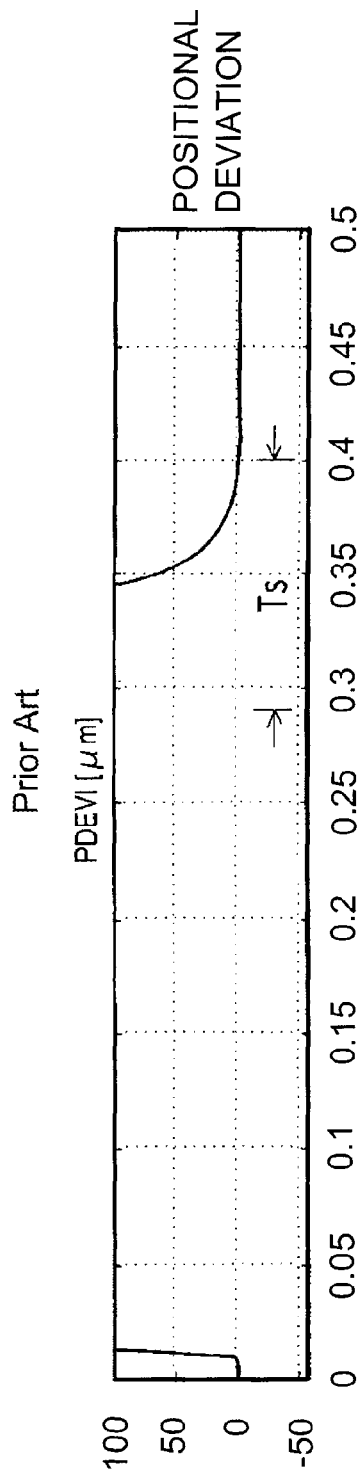
FIG. 6B shows the positional deviation with a prefilter being used.
Figure 7:
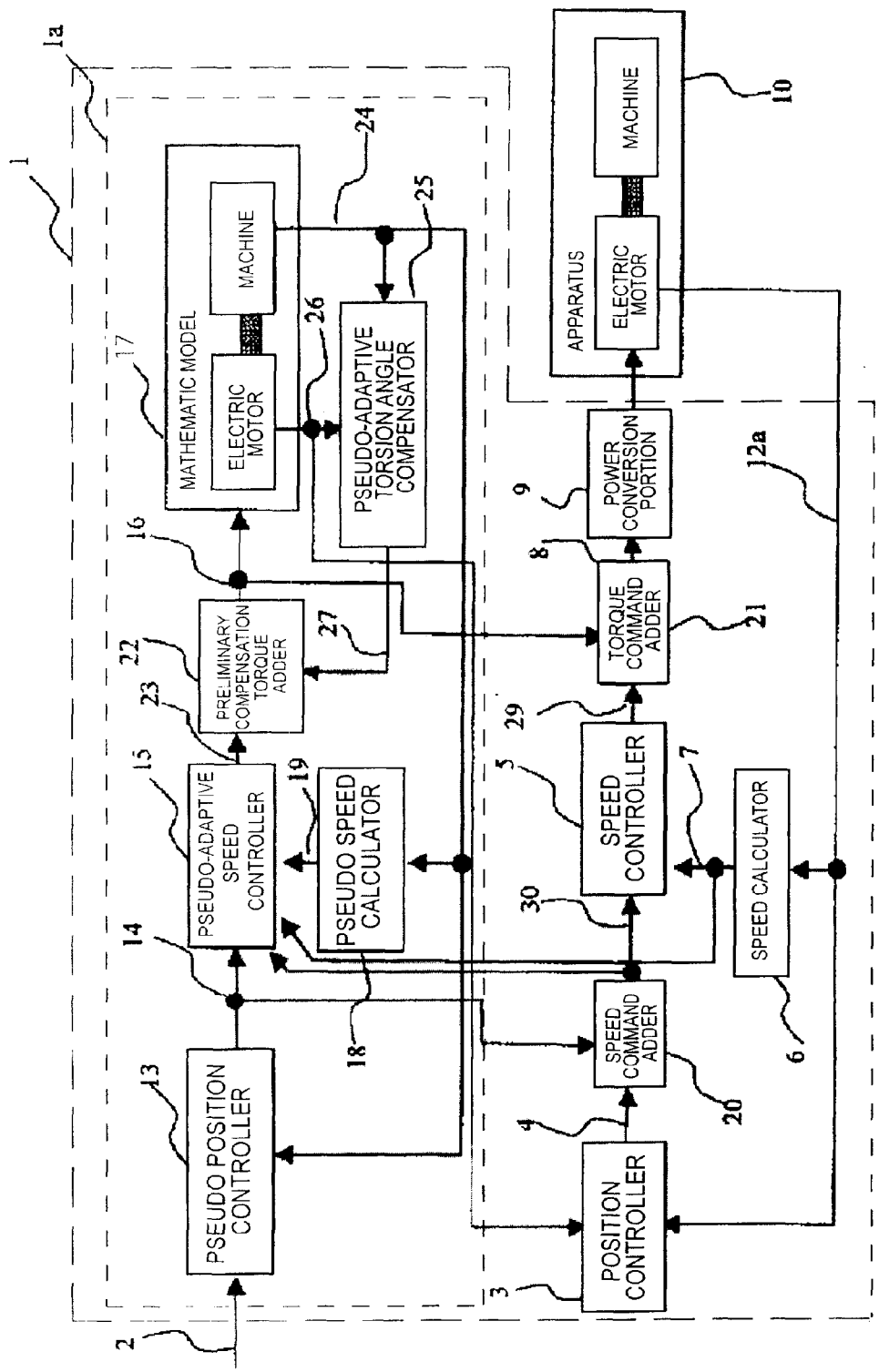
FIG. 7 shows the configuration of a motor control system adopting another conventional model following control.
Figure 8:
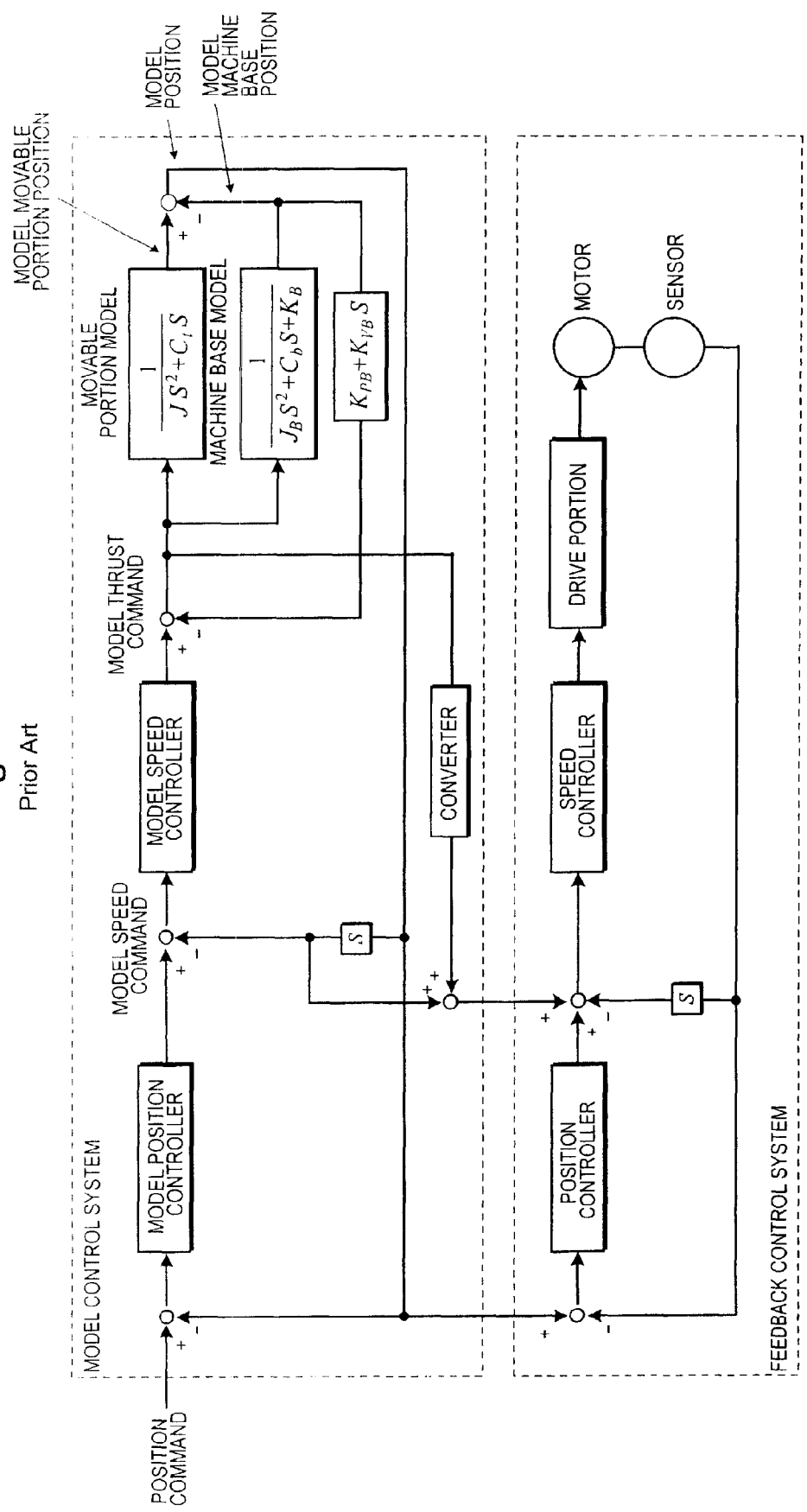
FIG. 8 shows the configuration of a motor control system adopting still another conventional model following control.
Figure 9:
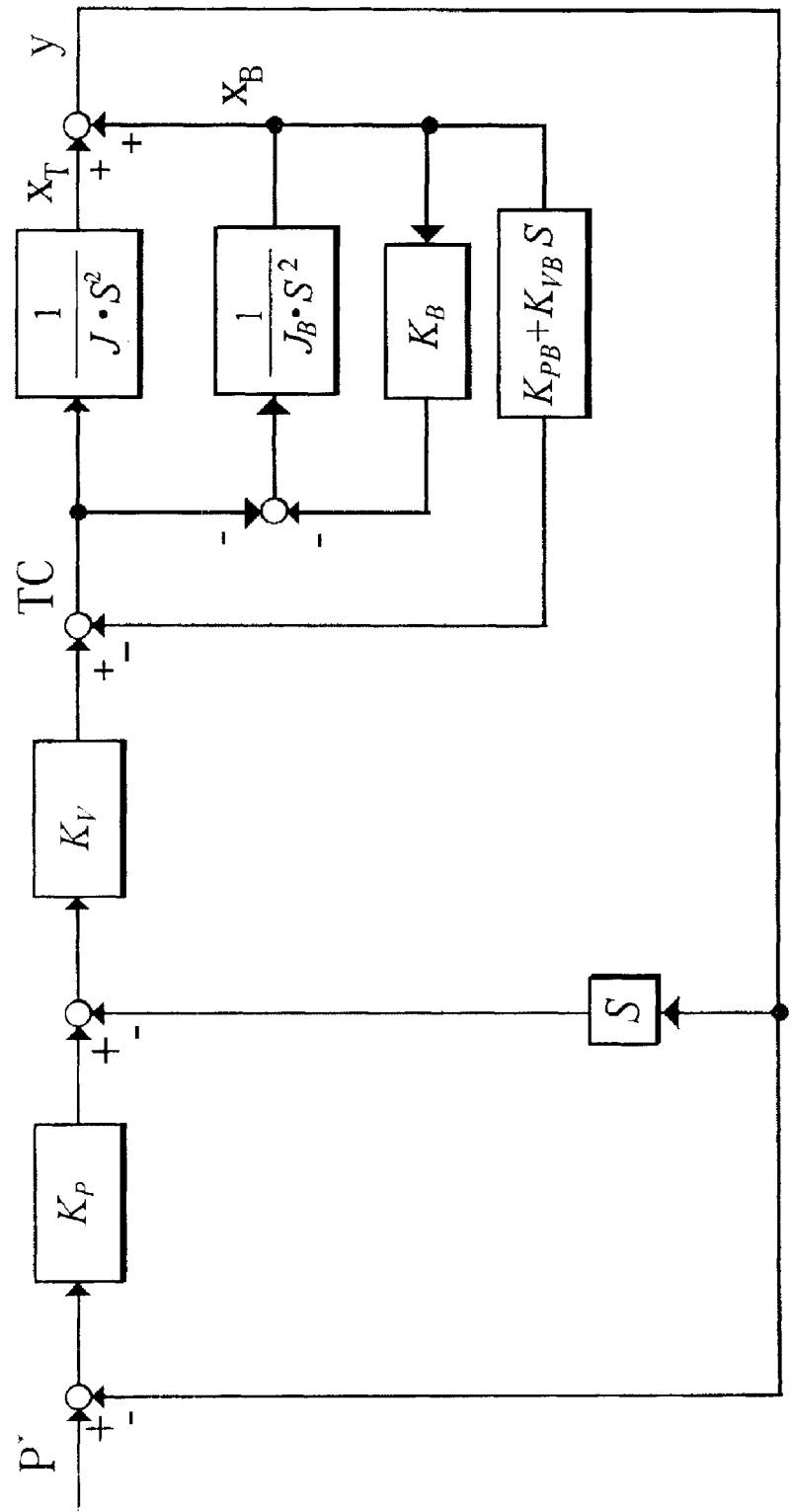
FIG. 9 shows a model control system of the motor control system shown in FIG. 8 with a damping term $C_b$ and a viscous resistance $C_t$ omitted.
Figure 12A:
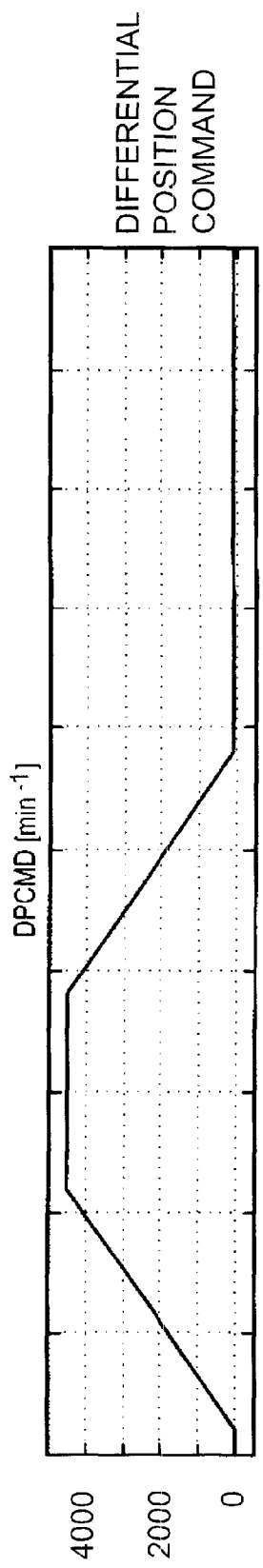
FIG. 12A shows a differential position command used in an embodiment.
Figure 12B:
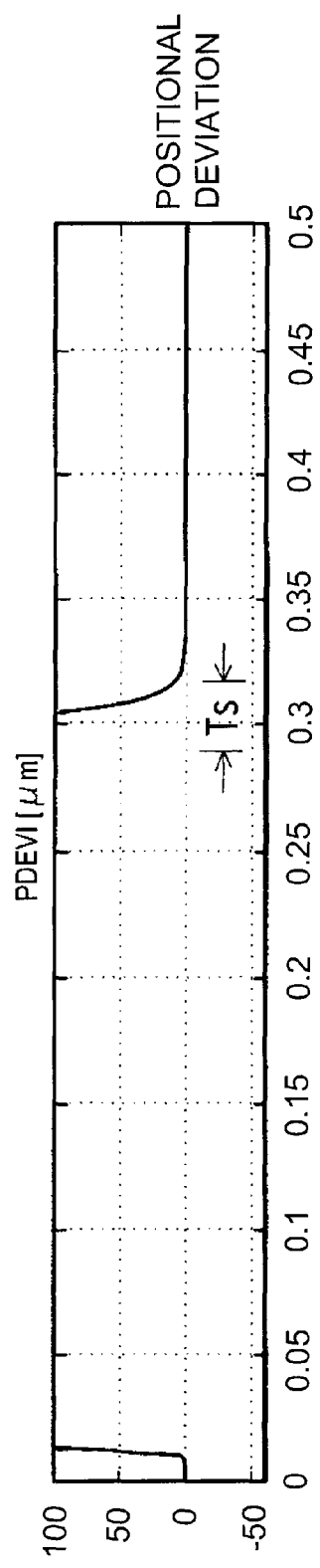
FIG. 12B shows the positional deviation when the cutoff frequency of the torque command low-pass filter is set to 600 Hz.
Figure 13A:
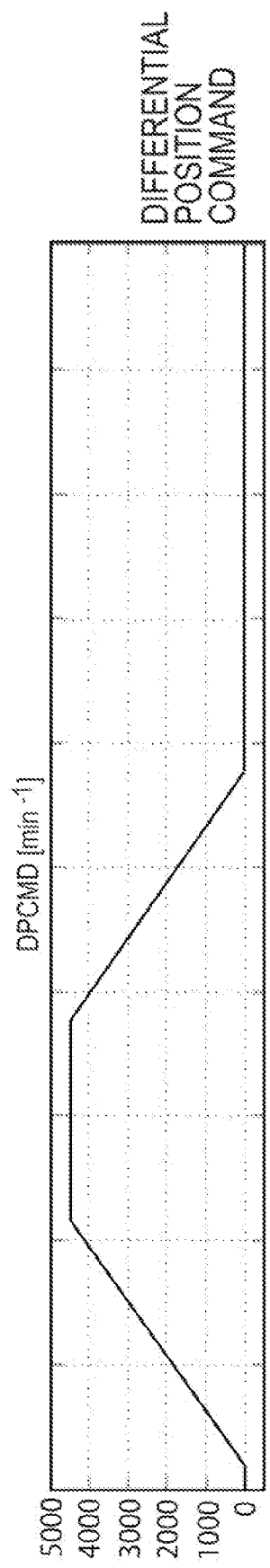
FIG. 13A shows a differential position command used in the embodiment.
Figure 13B:
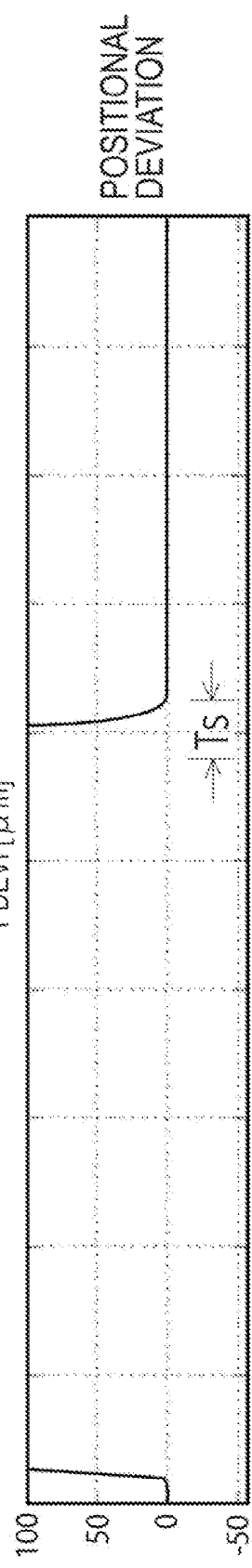
FIG. 13B shows the positional deviation when the cutoff frequency of the torque command low-pass filter is set to 1000 Hz.

Thus, according to the embodiment, the parameters for the feedback control system 103 are first adjusted in accordance with the actual mechanical system, and the parameters for the model control system 105 are then determined accordingly. FIG. 12B shows the results of simulating the positional deviation when positioning is performed using the parameters and the state feedback gains calculated as described above. FIG. 12A shows the differential position command used. In the simulation of FIG. 12B, the cutoff frequency of the torque command low-pass filter 115 and the model torque command low-pass filter 127 in the feedback control system 103 and the model control system 105, respectively, is set to 600 Hz. Other conditions are the same as in FIGS. 5A, 5B, 6A, and 6B. FIG. 13B shows the results of simulating the positional deviation when the cutoff frequency of the torque command low-pass filter 115 and the model torque command low-pass filter 127 of the feedback control system 103 and the model control system 105, respectively, is 1000 Hz increased from 600 Hz. FIG. 13A shows the differential position command used. As can be seen from FIGS. 12B and 13B, vibration of the machine base is suppressed with no vibration in the positional deviation. It can also be seen that high-speed positioning is achieved with a position settling time Ts shorter than that for the case of FIG. 6 where a prefilter is used.

According to the embodiment, as described above, the model machine base position information, the model machine base speed information, the model machine base acceleration information, and the low-pass filtered model torque command (four states) are fed back to be input to the model torque command low-pass filter 127 in the model control system 105. Then, the parameters for the model control system 105 are determined by applying the modern control theory to calculate the parameters such that the characteristic equations of the model control system have a repeated root. By feeding back the four states mentioned above as in the embodiment, it is possible to freely set parameters that are to be set freely in the feedback control system 103, such as the model position gain $K_P$, the model speed gain $K_V$, and the time constant of the model torque command low-pass filter 127, even under the constraint that the characteristic equations of the model control system 105 have a repeated root. This allows the parameters for the model control system 105 to be set so as to cause no vibration after the value of the torque command low-pass filter 115, the model position gain $K_P$, and the model speed gain $K_V$, which are to be set in consideration of the constraint in terms of the characteristics of the mechanical system in the high-frequency range, are set in the model control system 105. The feedback control system 103 is then driven to follow the model which causes no vibration and can be driven at a high speed. Consequently, a motor control system that suppresses vibration of a machine base and achieves high-speed positioning can be obtained even without a sensor that detects vibration of the machine base.

In the embodiment, model machine base position information, model machine base speed information, and model machine base acceleration information are each used as a state feedback amount. On condition that the low-pass filtered model torque command is used as a state feedback amount, however, the present invention is also applicable to the case where only the model machine base position information is used as a state feedback amount and the case where a combination of the model machine base position information and at least one of the model machine base speed information and the model machine base acceleration information is used as a state feedback amount.

Although a rotary motor is the target to be controlled in the embodiment, the present invention is also applicable to the control of a linear motor as a matter of course.

Although the parameters for the model control system are determined by applying the modern control theory to calculate the parameters such that the characteristic equations of the model control system have a repeated root in the embodiment, the characteristic equations do not necessarily have a repeated root. The method for calculating or determining the parameters for the model control system is not limited to the method used in the embodiment as long as the parameters are determined such that the model control system is stabilized and vibration is suppressed.

Moreover, the output of the model torque command low-pass filter 127 may be not added to the input to the torque command low-pass filter 115, but may be added to the input to the torque controller 117 as indicated by the dashed line in FIG. 1. The same result is obtained in this way.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A motor control system comprising:
   a feedback control system comprising:
      a position sensor that detects a position of a movable portion of a motor mounted on a machine base;
      a position controller that outputs a speed command based on position information on the position detected by the position sensor and a position command;
      a speed controller that outputs a torque command based on the speed command and speed information obtained from the position sensor;
      a torque command low-pass filter that suppresses a high-frequency component contained in the torque command; and
      a torque controller that controls a torque of the motor based on the torque command filtered by the torque command low-pass filter; and
   a model control system comprising:
      a movable portion model that models a motion of the movable portion of the motor to output model movable portion position information on the movable portion;
      a machine base model that models a motion of the machine base to output model machine base position information on the machine base;
      a model position controller that models the position controller to output a model speed command;
      a model speed controller that models the speed controller to output a model torque command;
      a model torque command low-pass filter that models the torque command low-pass filter to low-pass filter the model torque command to obtain a filtered model torque command, and gives the filtered model torque command to the movable portion model and the machine base model;
      a main feedback section that feeds back the model position controller and the model speed controller with model position information, which has been obtained by summing the model movable portion position information and the model machine base position information, as a model position command;
      a first feedback section that outputs a first feedback command, which contains at least the model machine base position information, based on the model machine base position information;
      a second feedback section that outputs a second feedback command which contains information contained in the filtered model torque command; and
      a subtraction section that calculates a differential between a sum of the first feedback command and the second feedback command and the model torque command to output the differential to an input portion of the model torque command low-pass filter and an input portion of the torque command low-pass filter as a differential model torque command,
   the model control system being configured to give the model position command to the position controller as the position command, and to add a model speed command, which has been generated based on the model position command, to the speed command to be input to the speed controller.

2. The motor control system according to claim 1, wherein the first feedback section is configured to generate the first feedback command which contains model machine base speed information and model machine base acceleration information on the machine base in addition to the model machine base position information.

3. The motor control system according to claim 1, wherein a gain set for the model position controller and a gain set for the model speed controller are set to be the same as a gain set for the position controller and a gain set for the speed controller, respectively; and a first feedback gain set for the first feedback section and a second feedback gain set for the second feedback section are set to suppress vibration of the machine base.

4. The motor control system according to claim 1, wherein a plurality of parameters in the model control system are set such that characteristic equations in state equations of the model control system have a quintuple root and that the feedback control system is stabilized.

5. A motor control system comprising:
   a feedback control system comprising:
      a position sensor that detects a position of a movable portion of a motor mounted on a machine base;
      a position controller that outputs a speed command based on position information on the position detected by the position sensor and a position command;
      a speed controller that outputs a torque command based on the speed command and speed information obtained from the position sensor;
      a torque command low-pass filter that suppresses a high-frequency component contained in the torque command; and
      a torque controller that controls a torque of the motor based on the torque command filtered by the torque command low-pass filter; and
   a model control system comprising:
      a movable portion model that models a motion of the movable portion of the motor to output model movable portion position information on the movable portion;
      a machine base model that models a motion of the machine base to output model machine base position information on the machine base;
      a model position controller that models the position controller to output a model speed command;
      a model speed controller that models the speed controller to output a model torque command;
      a model torque command low-pass filter that models the torque command low-pass filter to low-pass filter the model torque command to obtain a filtered model torque command, and gives the filtered model torque command to the movable portion model and the machine base model;
      a main feedback section that feeds back the model position controller and the model speed controller with model position information, which has been obtained by summing the model movable portion position information and the model machine base position information, as a model position command;
      a first feedback section that outputs a first feedback command, which contains at least the model machine base position information, based on the model machine base position information;

a second feedback section that outputs a second feedback command which contains information contained in the filtered model torque command; and a subtraction section that calculates a differential between a sum of the first feedback command and the second feedback command and the model torque command to output the differential to an input portion of the model torque command low-pass filter as a differential model torque command, the model control system being configured to give the model position command to the position controller as the position command; to add a model speed command, which has been generated based on the model position command, to the speed command to be input to the speed controller; and to add the filtered model torque command to the filtered torque command to be input to the torque controller.

6. The motor control system according to claim 5, wherein the first feedback section is configured to generate the first feedback command which contains model machine base speed information and model machine base acceleration information on the machine base in addition to the model machine base position information.

7. The motor control system according to claim 5, wherein a gain set for the model position controller and a gain set for the model speed controller are set to be the same as a gain set for the position controller and a gain set for the speed controller, respectively; and a first feedback gain set for the first feedback section and a second feedback gain set for the second feedback section are set to suppress vibration of the machine base.

8. The motor control system according to claim 5, wherein a plurality of parameters in the model control system are set such that characteristic equations in state equations of the model control system have a quintuple root and that the feedback control system is stabilized.

* * * * *